(12) United States Patent
Lu et al.

(10) Patent No.: US 8,723,730 B2
(45) Date of Patent: May 13, 2014

(54) SYSTEM AND METHOD FOR DIRECTION FINDING AND GEOLOCATION OF EMITTERS BASED ON LINE-OF-BEARING INTERSECTIONS

(75) Inventors: Ning Hsing Lu, Clifton, NJ (US); Chi Chiu Chan, Wayne, NJ (US); Qun Shi, Plainsboro, NJ (US)

(73) Assignee: Exelis Inc., McLean, VA (US)

( * ) Notice: Subject to any disclaimer, the term of this patent is extended or adjusted under 35 U.S.C. 154(b) by 268 days.

(21) Appl. No.: 13/191,696

(22) Filed: Jul. 27, 2011

(65) Prior Publication Data

US 2013/0027251 A1 Jan. 31, 2013

(51) Int. Cl.
*G01S 3/02* (2006.01)

(52) U.S. Cl.
USPC .......................................................... 342/464

(58) Field of Classification Search
USPC .......................................................... 342/464
See application file for complete search history.

(56) References Cited

U.S. PATENT DOCUMENTS

| | | | |
|---|---|---|---|
| 4,797,839 A | 1/1989 | Powell | |
| 5,055,851 A | 10/1991 | Sheffer | |
| 5,767,804 A | 6/1998 | Murphy | |
| 5,987,329 A | 11/1999 | Yost et al. | |
| 6,018,312 A | 1/2000 | Haworth | |
| 6,141,558 A | 10/2000 | Chen | |
| 6,259,404 B1 | 7/2001 | Parl et al. | |
| 6,414,634 B1 | 7/2002 | Tekinay | |
| 6,865,490 B2 | 3/2005 | Cauwenberghs et al. | |
| 7,071,791 B1 | 7/2006 | Wilson, III | |
| 7,292,189 B2 | 11/2007 | Orr et al. | |
| 7,564,408 B2 | 7/2009 | Glockler et al. | |
| 7,616,155 B2 | 11/2009 | Bull et al. | |
| 7,623,871 B2 | 11/2009 | Sheynblat | |
| 8,615,190 B2 | 12/2013 | Lu | |
| 2001/0053699 A1 | 12/2001 | McCrady et al. | |
| 2003/0204380 A1 | 10/2003 | Dishman et al. | |
| 2004/0029558 A1* | 2/2004 | Liu | 455/404.2 |
| 2004/0174258 A1* | 9/2004 | Edelstein et al. | 340/539.13 |
| 2004/0233100 A1 | 11/2004 | Dibbie et al. | |
| 2005/0032531 A1 | 2/2005 | Yi et al. | |
| 2005/0077424 A1 | 4/2005 | Schneider | |
| 2005/0242995 A1 | 11/2005 | Ferreol et al. | |
| 2005/0281363 A1 | 12/2005 | Qi et al. | |
| 2006/0038677 A1 | 2/2006 | Diener et al. | |
| 2006/0128311 A1 | 6/2006 | Tesfai | |

(Continued)

FOREIGN PATENT DOCUMENTS

WO 2007063537 A1 6/2007

OTHER PUBLICATIONS

Lu, "A Signal-To-Noise Ratio Enhancer", SAS 2011—IEEE Sensors Application Symposium, Feb. 22-24, 2011, 5 pages.

(Continued)

*Primary Examiner* — Harry Liu
(74) *Attorney, Agent, or Firm* — Edell, Shapiro & Finnan, LLC

(57) ABSTRACT

According to an embodiment of the present invention an emitter geolocation technique determines the geolocation of a radio frequency (RF) emitter using pair-wise line-of-bearing intersections that are derived from signal-to-noise ratios of transmitted signals received at a sensor. The technique may be employed with ground based vehicle or small unmanned air vehicles (UAV), and obtains reliable geolocation estimates of radio frequency (RF) emitters of interest.

49 Claims, 9 Drawing Sheets

(56) References Cited

U.S. PATENT DOCUMENTS

| | | | |
|---|---|---|---|
| 2006/0240839 | A1 | 10/2006 | Chen et al. |
| 2007/0069949 | A1 | 3/2007 | Ferreol et al. |
| 2007/0115175 | A1 | 5/2007 | Velicer et al. |
| 2008/0129600 | A1 | 6/2008 | Thomas |
| 2008/0186235 | A1 | 8/2008 | Struckman et al. |
| 2009/0146881 | A1 | 6/2009 | Mesecher |
| 2010/0034133 | A1* | 2/2010 | Marom et al. ............... 370/315 |
| 2010/0106745 | A1 | 4/2010 | Cho et al. |
| 2010/0151810 | A1* | 6/2010 | Grau Besoli et al. ......... 455/311 |
| 2010/0190507 | A1* | 7/2010 | Karabinis et al. .......... 455/452.1 |
| 2010/0284359 | A1* | 11/2010 | Kim et al. ................... 370/329 |
| 2010/0321242 | A1 | 12/2010 | Tyler et al. |
| 2011/0018766 | A1* | 1/2011 | Steer et al. ................... 342/368 |
| 2011/0199916 | A1* | 8/2011 | Garrett et al. ................ 370/252 |
| 2012/0235864 | A1 | 9/2012 | Lu |
| 2012/0293371 | A1 | 11/2012 | Lu |
| 2012/0309288 | A1 | 12/2012 | Lu |

OTHER PUBLICATIONS

Ning H. Lu, "Linearized, Unified Two-Ray Formulation for Propagation over a Plane Earth", Sicon/05—Sensors for Industry Conference; Houston, Texas, USA, Feb. 8-10, 2005.
Ada S. Y. Poon et al., "Degrees of Freedom in Multiple-Antenna Channels: A Signal Space Approach", IEEE Transaction Information Theory Society, vol. 51, Issue 2.
Seungjin Choi, "Blind Source Separation and Independent Component Analysis: A Review", Neural Information Processing—Letters and Review, vol. 6, No. 1, Jan. 2005, pp. 1-57.
M. Ryyan Khan et al., "Iterative Noise Power Subtraction Technique for Improved SNR in Speech Enhancement", pp. 1-3.
Fredrik Gustafsson et al., "Positioning Using Time-Difference of Arrival Measurements", pp. 1-4.
European Search Report, EP1216677, Sep. 12, 2012, 6 pages.
European Search Report, EP12166578, Oct. 1, 2012, 6 pages.
Cardoso, "Blind Signal Separation: Statistical Principles", Proceedings of the IEEE, vol. 86, No. 10, Oct. 1998, pp. 2009-2025.
European Search Report, EP12159186, Jul. 11, 2012, 6 pages.
Robinson et al., "Received Signal Strength Base Location Estimation of a Wireless LAN Client", IEEE Communications Society, Wireless Communications and Networking Conference 2005, pp. 2350-2354.
Wikipedia Article, "Multilateration", Feb. 17, 2010 version, pp. 1-5.
Wikipedia Article, "Trilateration", Feb. 9, 2010 version, pp. 1-3.
Xinrong Li, "RSS-Based Location Estimation With Unknown Pathloss Model", IEEE Transactions on Wireless Communications, vol. 5, No. 12, Dec. 2006; pp. 3626-3633.
Ralph O. Schmidt, "Multiple Emitter Location and Signal Parameter Estimation", IEEE Transactions on Antennas and Propagation, vol. AP-34, No. 3, Mar. 1986; pp. 276-280.
George V. Serebryakov, "Direction-of-Arrival Estimation of Correlated Sources by Adaptive Beamforming", IEEE Transactions on Signal Processing, vol. 43, No. 11, Nov. 1995; pp. 2782-2787.
Yihong Qi et al., "On Time-of-Arrival Positioning in a Multipath Environment", IEEE Transactions on Vehicular Technology, vol. 55, No. 5, Sep. 2006; pp. 1516-1526.
A. Tennant et al., "Direction Finding Using a Four-Element Time-Switched Array System", 2008 Loughborough Antennas & Propogation Conference; Mar. 17-18, 2008, Loughborough, UK; 2008 IEEE; pp. 181-184.
A. Tennant et al., "A Two-Element Time-Modulated Array With Direction-Finding Properties", IEEE Antennas and Wireless Propagation Letters, vol. 6, 2007; pp. 64-65.
Harry Urkowitz, "Energy Detection of Unknown Deterministic Signals", Proceedings of the IEEE, vol. 55, No. 4, Apr. 1967; pp. 523-531.
Ning H. Lu, "Linearized, Unified Two-Ray Formulation for Propagation over a Plane Earth", Sicon/05- Sensors for Industry Conference; Houston, Texas, USA, Feb. 8-10, 2005.
Guolin Sun et al., "Signal Processing Techniques in Network-Aided Positioning", IEEE Signal Processing Magazine [12] Jul. 2005.
Bo-Chieh Liu et al., "Analysis of Hyperbolic and Circular Positioning Algorithms Using Stationary Signal-Strength-Difference Measurements in Wireless Communications", IEEE Transactions on Vehicular Technology, vol. 55, No. 2, Mar. 2006; pp. 499-509.
Ada S. Y. Poon et al., "Degrees of Freedom in Multiple-Antenna Channels: A Signal Space Approach", IEEE Transaction Information Theory Society, vol. 51, Issue 2. Feb. 2005.
Seungjin Choi, "Blind Source Separation and Independent Component Analysis: A Review", Neural Information Processing-Letters and Review, vol. 6, No. 1, Jan. 2005, pp. 1-57.
Ludwig Rota et al., "Parallel Deflation with Alphabet-Based Criteria for Blind Source Extraction", Proc. SSP-2005, 13th IEEE Workshop on Statistical Signal Processing, Jul. 2005, pp. 1-5.
J. Durbin et al., "Time series analysis of non-Gaussian observations based on state space models from both classical and Bayesian perspectives", Dec. 1998, pp. 1-26.
Shlomo Dubnov, "Generalization of Spectral Flatness Measure for Non-Gaussian Linear Processes", Oct. 30, 2002, pp. 1-6.
M. Ryyan Khan et al., "Iterative Noise Power Subtraction Technique for Improved SNR in Speech Enhancement", pp. 1-3. , Jan. 1, 2010.
Fredrik Gustafsson et al., "Positioning Using Time-Difference of Arrival Measurements", pp. 1-4. 2003.
European Search Report dated Dec. 20, 2013, EP12177418, 3 pages.
"Pursuing A Lost Course", Electronics World, Nexus Media Communications, Swanley, Kent, GB, vol. 97, No. 1674, May 1, 1992, pp. 424-427, XP000290553, ISSN: 0959-8332.
Buchner et al, "A Generalization of Blind Source Separation Algorithms for Convolutive Mixtures Based on Second Order Statistics," IEEE Trans. on Speech and Audio Processing, vol. 13, No. 1, Jan. 2005.
Ukai et al, "Multistage SIMO-Model-Based Blind Source Separation Combining Frequency Domain ICA and Time Domain ICA," IEEE International Conference on Acoustics, Speech, and Signal Processing, vol. 4, 2004, pp. 109-112.
Aichner et al, "Post Processing for Convolutive Blind Source Separation," Proc. IEEE International Conf. Acoustics, Speech, Signal Processing (ICASSP), vol. 5, pp. 37-40, May 2006.

* cited by examiner

US 8,723,730 B2

SYSTEM AND METHOD FOR DIRECTION FINDING AND GEOLOCATION OF EMITTERS BASED ON LINE-OF-BEARING INTERSECTIONS

BACKGROUND

1. Technical Field

The present invention embodiments pertain to determining locations of emitters. In particular, the present invention embodiments pertain to determining locations of radio frequency (RF) emitters based on lines-of-bearing at various locations to the emitters.

2. Discussion of Related Art

Conventional techniques for direction finding (DF), i.e., determining a line-of-bearing (LOB), and geolocation of a radio frequency (RF) emitter are commonly based on measurements of a received signal strength (RSS) of signals transmitted from the emitter. The received signal strength (RSS) is usually integrated over the duration of the transmitted signal in order to obtain a signal energy measurement and enhance signal to noise ratio. Since the transmitted radio frequency (RF) signal attenuates during propagation through space, the received signal strength (RSS) of the signal may be used to estimate the distance from the receiver to the emitter. However, this technique may not be very accurate due to multipath fading, shadowing effects, and path loss modeling errors that may significantly distort the expected received signal strength (RSS).

Furthermore, conventional line-of-bearing (LOB) intersection based geolocation techniques are all based on least-squares (LS) approaches to solve over-determined linear and non-linear equations. However, the LS based approaches often provide biased estimates and are computationally expensive.

In order to improve the accuracy, the conventional line-of-bearing (LOB) and geolocation techniques may employ a radio frequency (RF) propagation map of the environment. The map is basically a database with information created from known terrain data and learned from observed energy measurements at different combinations of emitter and receiver locations. The improved geolocation technique determines the best fit in the energy space to potential emitter locations based on the radio frequency (RF) propagation map. However, this improved technique requires a large number of real-time measurements and/or terrain modeling. Thus, this technique can only be used in applications in which the radio frequency (RF) propagation map is available, and sufficient computing capacity exists to process the large amount of data.

SUMMARY

An embodiment of the present invention pertains to a pair-wise line-of-bearing (LOB) emitter geolocation technique that determines the geolocation of a radio frequency (RF) emitter based on signal-to-noise ratio (SNR) of received signals. The technique may be employed using a ground-based or small unmanned aerial vehicles (UAV), and obtains reliable geolocation estimates of radio frequency (RF) emitters of interest.

Present invention embodiments provide several advantages. For example, the techniques described herein differ from conventional least-squares (LS) estimation by providing an unbiased estimator that does not require matrix pseudo-inverse operation which can be computationally expensive. The present invention embodiments are comparable to the least-squares (LS) approach with respect to performance and can have a significant performance improvement over the least-squares (LS) approach in certain environments. The present invention embodiments computationally converge to an optimal solution at large signal-to-noise ratios (SNRs).

The above and still further features and advantages of present invention embodiments will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

Embodiments of the present invention pertain to a pair-wise line-of-bearing (LOB) based geolocation technique that obtains reliable geolocation estimates of a radio frequency (RF) emitter based on signal-to-noise ratios (SNRs) of transmitted signals received at a sensor. The geolocation of a radio frequency (RF) emitter is a critical need for many applications. The technique of present invention embodiments may be employed with a ground-based or with unmanned aerial vehicles (UAV). These types of vehicles are well suited for enabling pair-wise line-of-bearing (LOB) geolocation of radio frequency (RF) emitters of interest.

Figure 1:
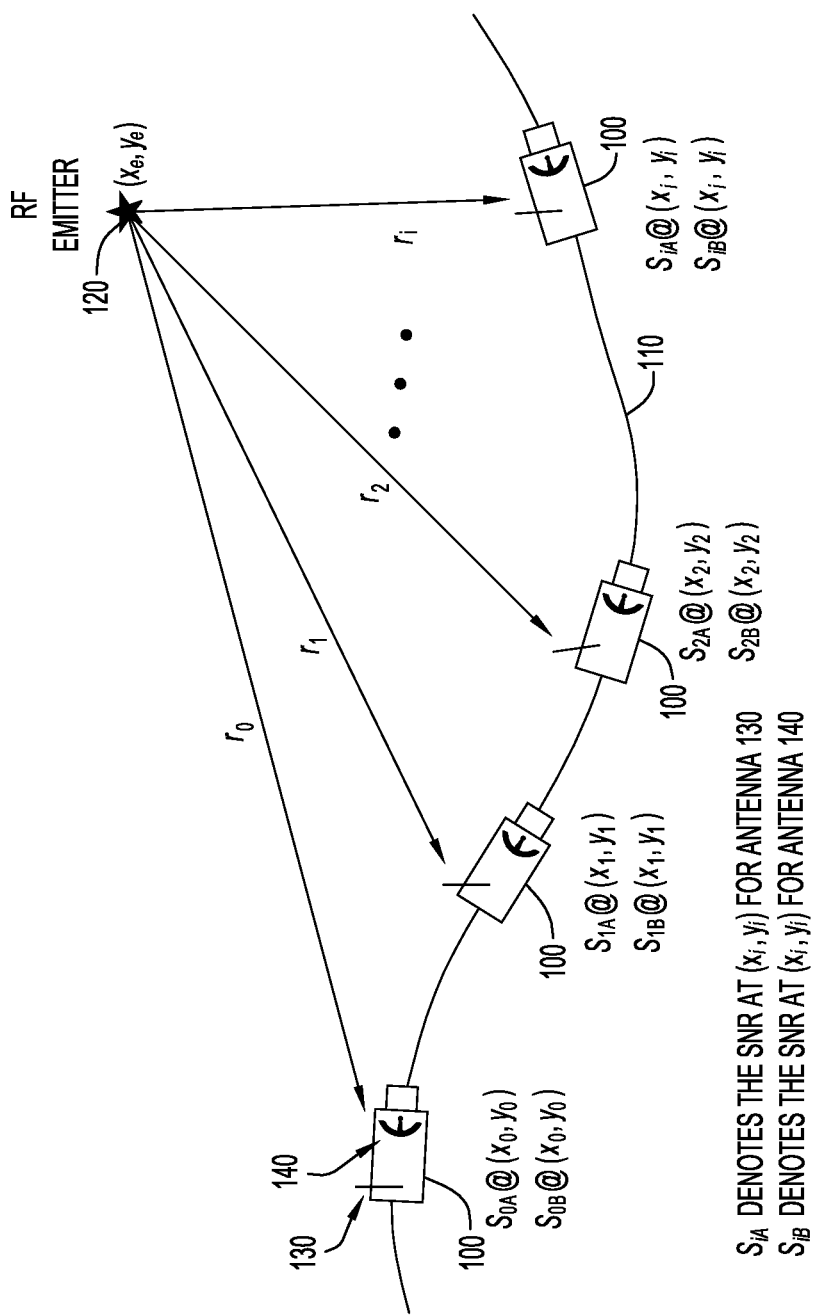
FIG. 1 is a diagrammatic illustration of an example environment for determining geolocation of a radio frequency (RF) emitter according to an embodiment of the present invention.

An example environment for determining the geolocation of a radio frequency (RF) emitter is illustrated in FIG. 1. Specifically, the environment includes a radio frequency (RF) emitter 120 and a mobile sensor 100 (e.g., a truck or tracked vehicle with radio frequency (RF) sensors, etc.). The mobile sensor travels along a path 110 (e.g., a road or other suitable measuring path). Mobile sensor 100 includes an omni-directional antenna 130 and a directional antenna 140 that receives signals from radio frequency (RF) emitter 120 in order to measure the signal-to-noise ratios (SNRs) of those signals as described below.

By way of example, radio frequency (RF) emitter 120 is positioned at an unknown location $(x_e, y_e)$ as shown, while mobile sensor 100 receives signals transmitted from the radio frequency (RF) emitter 120 at known locations along path 110 (as viewed in FIG. 1). The approach to resolving an emitter position is to estimate the signal-to-noise ratios (SNRs) obtained from multiple locations. In this example, the platform 100 takes a quantity, i, of signal-to-noise ratio (SNR) measurements denoted as $S_{0A}$-$S_{iA}$ for omni-directional antenna 130 and denoted as $S_{0B}$-$S_{iB}$ for directional antenna 140 at locations $(x_0, y_0), (x_1, y_1) \ldots x_i, y_i)$, respectively, as viewed in FIG. 1. The signal-to-noise ratio (SNR) measurements correspond to a radius or distance from RF emitter 120 shown at $r_0$-$r_i$. The signal-to-noise ratio (SNR) measurements at individual locations (e.g., $S_{0A}$ and $S_{0B}$) will generally be different from each other because the gain of omni-directional antenna 130 will be different from the gain of directional antenna 140. Given the known gain characteristics of each antenna, $S_{0A}$ and $S_{0B}$ can be compared to each other to determine a line-of-bearing (LOB) to radio frequency (RF) emitter 120.

The measurements from multiple locations could be attained by taking measurements from a single platform traveling to different locations or by taking measurements from various platforms at different locations and networking/sharing the data to perform pair-wise line-of-bearing (LOB) based geolocation. Since there are measurement errors due to path loss modeling, signal fading, shadowing effects, noise/interference, antenna pattern effects, time-varying channel and transmit power effects, and implementation errors, computing the emitter position may use a median value method to determine the centroid of the estimated locations. An example algorithm using a median value method will be described hereinafter.

Mobile sensor 100 measures at selected locations (e.g., $(x_0, y_0), (x_1, y_1) \ldots (x_i, y_i)$ as viewed in FIG. 1) the signal-to-noise ratio (SNR) (e.g., $S_{0A}$-$S_{iA}$ and $S_{0B}$-$S_{iB}$ as viewed in FIG. 1) of radio frequency (RF) signals emitted by emitter 120. The signal-to-noise ratio (SNR) at each location is proportional to the distance (e.g., $r_0, r_1 \ldots r_i$ as viewed in FIG. 1) between that location and radio frequency (RF) emitter 120. The signal-to-noise ratio (SNR) is the ratio of received signal power ($P_S$) to noise power $P_N$ (i.e., SNR=$P_S/P_N$). Accordingly, the signal-to-noise ratio (SNR) may be estimated based on received signal power or signal amplitude.

Once mobile sensor 100 collects the signal-to-noise ratio (SNR) measurements, the geolocation estimate of radio frequency (RF) emitter 120 is determined based on those measurements as described below. The signal-to-noise ratio (SNR) measurements may be collected by using a terrain based vehicle, an unmanned aerial vehicle (UAV), or other platform along a flight or other pre-planned path, or by using plural vehicles or other platforms each collecting a measurement at one or more locations and not necessarily along a planned path. In other words, measurements from plural locations may be ascertained via a single platform traveling to different locations, or via plural platforms each positioned at different locations and networking or otherwise sharing the collected data for the geolocation determination. Although FIG. 1, by way of example only, indicates measurements at certain locations (e.g., $(x_0, y_0), (x_1, y_1) \ldots (x_i, y_i)$ as viewed in FIG. 1), any quantity of signal-to-noise ratio (SNR) measurements (e.g., $S_{iA}$ and $S_{iB}$ where i=0 to N) may be collected at any corresponding locations ($(x_i, y_i)$, where i=0 to N) within the range of emitter 120.

Figure 2:
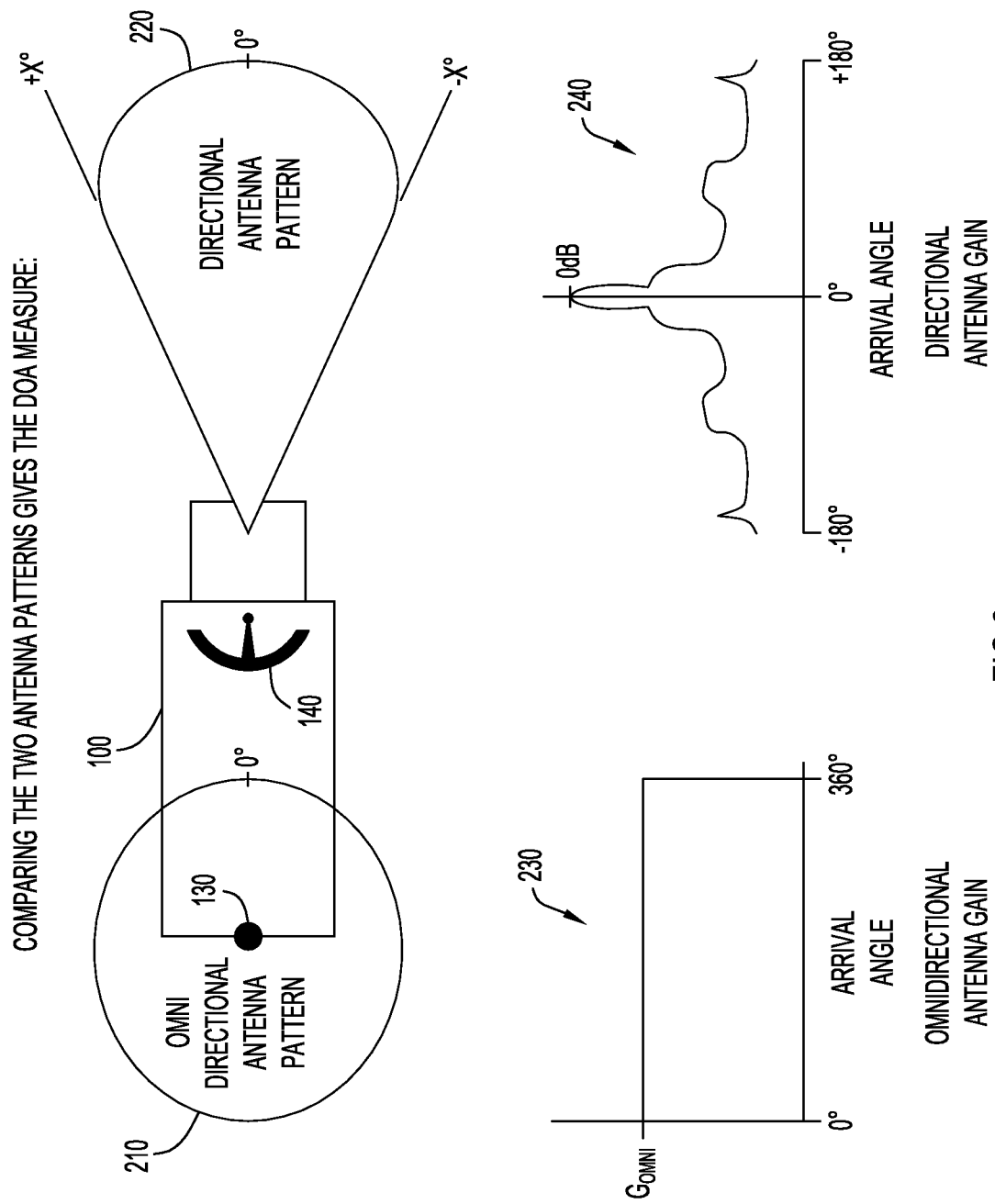
FIG. 2 is a diagram of antenna gain patterns for omni-directional and directional antennas mounted on a vehicle to determine geolocation of a radio frequency (RF) emitter according to an embodiment of the present invention.

Example system radiation patterns for determining the geolocation of a radio frequency (RF) emitter according to an embodiment of the present invention is illustrated in FIG. 2. Omni-directional antenna 130 and directional antenna 140 are shown mounted on mobile sensor 100. The omni-directional antenna has a circular radiation and reception pattern 210 as viewed from above, while directional antenna 140 is shown with a generally conical antenna pattern 220. The respective gains in relation to signal arrival angle of each antenna are graphically represented by graphs 230 and 240 directly below corresponding antenna patterns 210 and 220. Omni-directional gain 230 is linear regardless of the arrival angle (i.e., the angle of arrival (AOA)) of the received signal. In this example, directional antenna gain 240 is shown as a simplified gain for a fixed mounted parabolic antenna with the maximum gain at an arrival angle of zero degrees corresponding to the front of mobile sensor 100.

The signal-to-noise ratio (SNR) of a signal received by the omni-directional antenna 130 (e.g., $S_{iA}$) and the signal-to-noise ratio (SNR) of a signal received by the directional antenna 140 (e.g., $S_{iB}$) form a pair of signal-to-noise ratio (SNR) measurements that correspond to an arrival angle that can be found by way of directional antenna gain 240. The ratio of the signal-to-noise ratio (SNR) measurements, for example $S_{iB}/S_{iA}$, will correspond to an arrival angle on the directional antenna gain graph 240. Conceptually, the angle of arrival (AOA) that antennas 130 and 140 "see" for a signal from radio frequency (RF) emitter 120 to mobile sensor 100 is approximately 180 degrees apart from the line-of-bearing (LOB) from mobile sensor 100 to radio frequency (RF) emitter 120 (i.e., LOB~=AOA±180° relative to the measurement heading). Radio frequency (RF) channels effects may distort the AOA perceived by antennas 130 and 140.

To simplify the calculations of the lines-of-bearing (LOBs), the antenna patterns may be stored in digital form. For example, the relative gain patterns may be stored in a database or in tabular form in which the signal-to-noise ratio (SNR) measurements $S_{iA}$ and $S_{iB}$ are lookup parameters.

Figure 3:
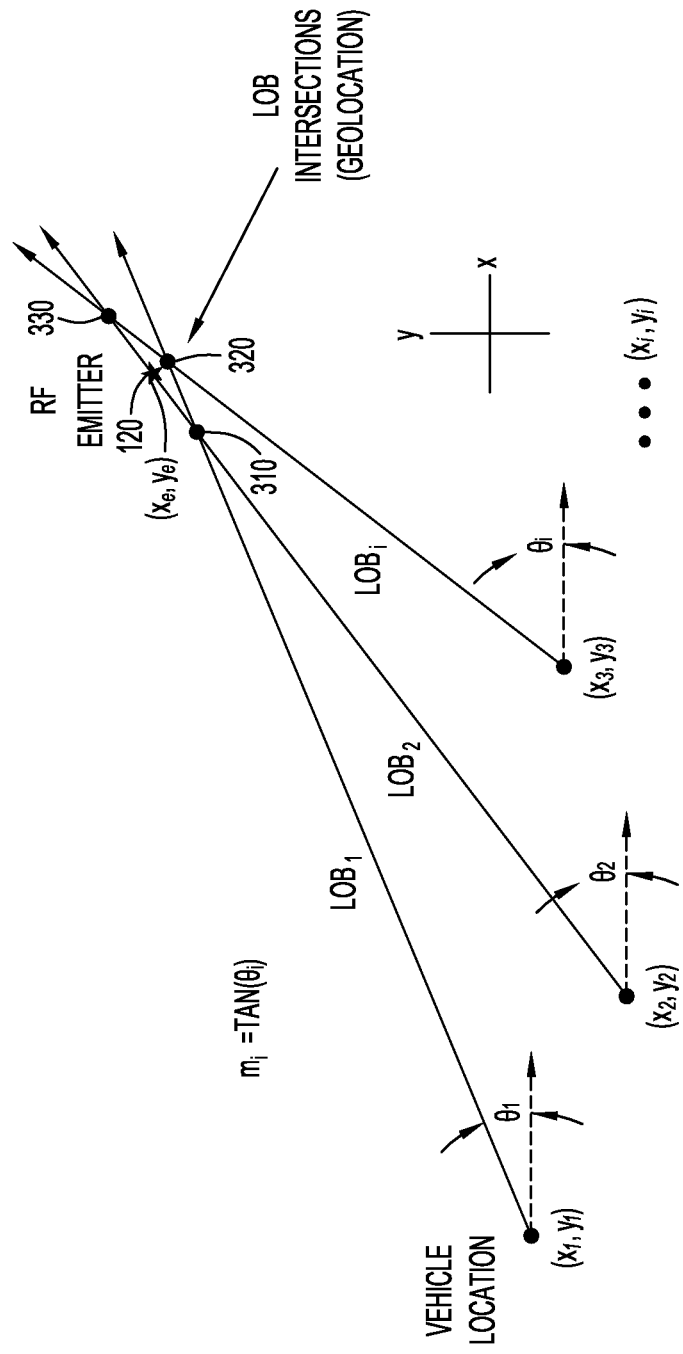
FIG. 3 is a vector diagram illustrating the manner in which pair-wise lines-of-bearing (LOB) are used to perform geolocation of a radio frequency (RF) emitter according to an embodiment of the present invention.

A plurality of line-of-bearing (LOB) measurements to radio frequency (RF) emitter 120 is shown in FIG. 3. The plurality of line-of-bearing (LOB) measurement locations $(x_1, y_1) (x_2, y_2) \ldots (x_i, y_i)$ are shown progressively from left to right in FIG. 3 according to a Cartesian coordinate system with zero degrees on the horizontal axis X. At each of the measurement locations $(x_1, y_1) (x_2, y_2) \ldots (x_i, y_i)$, a corresponding line-of-bearing (LOB) angle $\theta_1, \theta_2 \ldots \theta_i$, to radio frequency (RF) emitter 120 is estimated. The slope $m_1, m_2 \ldots m_i$ of the line-of-bearing (LOB) $LOB_1, LOB_2 \ldots LOB_i$ as shown may be expressed as a trigonometric tangent of corresponding line-of-bearing (LOB) angle $\theta_1, \theta_2 \ldots \theta_i$, i.e., $m_i=\tan(\theta_i)$. The intersections of the lines-of-bearing (LOBs) provide estimates 310, 320, and 330 of the location of radio frequency (RF) emitter 120. The estimates 310, 320, and 330 are combined to provide an overall estimate of the location $(x_e, y_e)$ of radio frequency (RF) emitter 120 as described hereinafter.

In this example, the measuring vehicle (e.g., mobile sensor 100) has a fixed platform heading of zero degrees and it is assumed that the directional antenna does not rotate within the X-Y plane. The coordinate systems used for the geolocation techniques described herein may be mathematically rotated or translated to compensate for actual vehicle heading or to account for antenna rotation for those geolocation systems that employ a steerable directional antenna.

For each pair of measurement locations, e.g., $(x_1, y_1)$ and $(x_2, y_2)$ or $(x_{i-1}, y_{i-1})$ and $(x_i, y_i)$, two linear equations may be set up that may form an intersection that is an estimate of the position of radio frequency (RF) emitter 120 at actual location $(x_e, y_e)$. There is a possibility that the two equations will not intersect indicating the one or both line-of-bearing (LOB) estimates in the pair are invalid. For measurement locations $(x_1, y_1)$ and $(x_2, y_2)$, two example linear equations (e.g., the slope $m=\Delta y/\Delta x$ or $\Delta y=m\Delta x$) are provided below:

$$y_e - y_1 = m_1(x_e - x_1) \quad \text{(Equation 1)}$$

$$y_e - y_2 = m_2(x_e - x_2) \quad \text{(Equation 2)}$$

where $(x_1, y_1)$ and $(x_2, y_2)$ are known measurement locations, and $m_1$ and $m_2$ are determined from the tangent of the corresponding line-of-bearing (LOB) angle.

Equations 1 and 2 may be expressed in matrix form for a solution that estimates the position of radio frequency (RF) emitter 120.

$$\text{Estimate of } \begin{pmatrix} x_e \\ y_e \end{pmatrix} = \begin{pmatrix} -m_1 & 1 \\ -m_2 & 1 \end{pmatrix}^{-1} \begin{pmatrix} y_1 - m_1 x_1 \\ y_2 - m_2 x_2 \end{pmatrix} \quad \text{(Equation 3)}$$

The estimated position 310 of radio frequency (RF) emitter 120 is provided by Equation 3. Estimated positions 320 and 330 may be solved with a substitution of measurement positions and corresponding slopes. Each measurement location may also be indexed with a different variable j (e.g., location $(x_j, y_j)$) in order to generalize Equation 3. Equation 3 is generalized in Equation 4 to generate a series of pair-wise line-of-bearing (LOB) intersection points $(x_{ij}, y_{ij})$, where measurement location $(x_i, y_i) \neq$ measurement location $(x_j, y_j)$.

$$\begin{pmatrix} x_{ij} \\ y_{ij} \end{pmatrix} = \begin{pmatrix} -m_i & 1 \\ -m_j & 1 \end{pmatrix}^{-1} \begin{pmatrix} y_i - m_i x_i \\ y_j - m_j x_j \end{pmatrix} \quad \text{(Equation 4)}$$

for $i, j = 1, 2 \ldots N$, $i \neq j$, where N is the number of measurement locations. For N measurement locations, there is a total of $M = N(N-1)/2$ intersect points. All the intersect points essentially form a scattergram of geolocation estimates around or near the true emitter location $(x_e, y_e)$. Note that the actual number of intersect points denoted as M', may be less than M due to data filtering, and that the lines-of-bearing (LOBs) are represented in a vector form, so invalid intersect points must be discarded as described later. Data filtering is described below.

A number of signal-to-noise ratio (SNR) measurements may be grouped into a cluster. The cluster measurements may be used to form a single line-of-bearing (LOB) estimate. In this regard, in FIG. 3 each line-of-bearing (LOB) estimate may be considered as being on a per cluster basis, and the total number M of intersect points are obtained according to N clustered measurement locations. The cluster measurement techniques will be described in connection with FIG. 5.

The centroid of the pair-wise intersect points may be obtained by taking the median value of all the intersect points, as the final geolocation estimate. Since the line-of-bearing (LOB) estimate is a function of signal-to-noise ratio (SNR), vehicle location geometry, and other random variables, the arithmetic mean values of the intersect points may be perturbed by these random fluctuations more than the arithmetic median values. In other words, a traditional least-squares (LS) method provides a more biased estimate than a median value method. This is true because the mean value may be skewed by several large perturbing outliers, while the median value is robust to outliers and will not be skewed.

For example, let M be the total number of intersect points, and $(x_m, y_m)$ be the geolocation of the $m^{th}$ intersect point. For the median value method, the line-of-bearing (LOB) centroid geolocation $(x_C, y_C)$ can be expressed by:

$$x_C = \text{median}(x_1, x_2 \ldots x_M)$$

$$y_C = \text{median}(y_1, y_2 \ldots y_M)$$

The absolute error for the median value method is shown in Equation 5.

$$\epsilon_x = |x_C - x_0|$$

$$\epsilon_y = |y_C - y_0| \quad \text{(Equation 5)}$$

where $(x_0, y_0)$ is the true emitter location.

The root-mean-square-error (RMSE) of the median value method can be computed using Equation 6:

$$x^I_{rmse} = \sqrt{\frac{1}{M} \sum (x_m - x_C)^2} \quad \text{(Equation 6)}$$

$$y^I_{rmse} = \sqrt{\frac{1}{M} \sum (y_m - y_C)^2}$$

for $m = 1, 2 \ldots M$

It can be shown that the median estimate is median-unbiased and robust. For example, see "On Small-Sample Estimation", the Annals of Mathematical Statistics, by G. W. Brown, December, 1947. As the signal-to-noise ratio (SNR) increases and the number of estimated points becomes large, the median value will converge to the mean value and the error variance will converge to zero (since the line-of-bearing (LOB) error will converge to zero).

Figure 4:
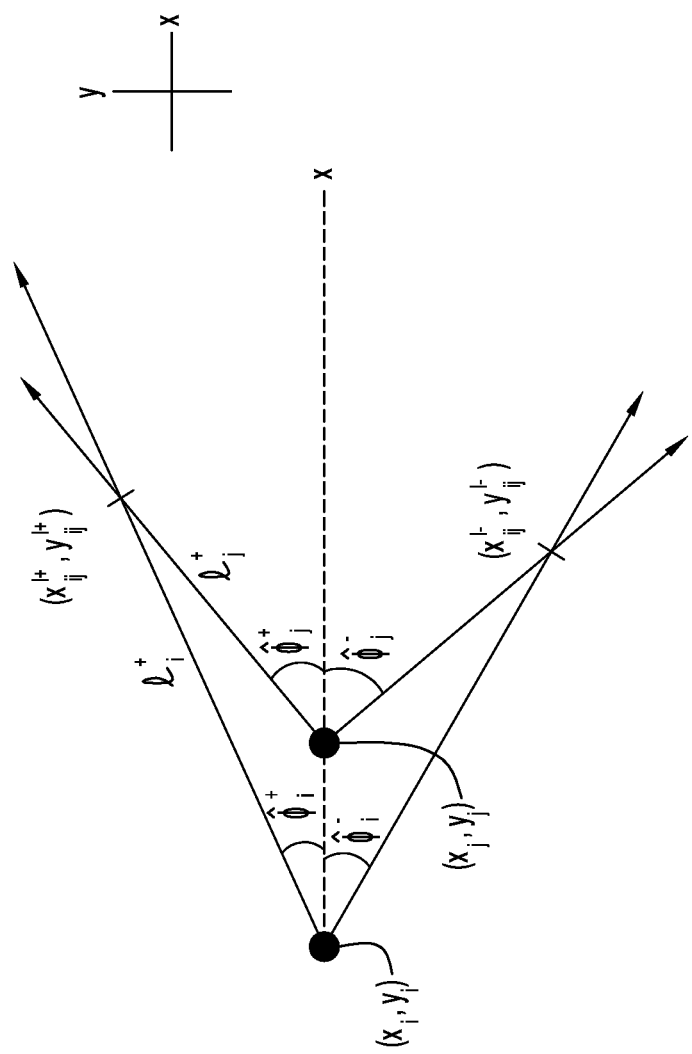
FIG. 4 is a vector diagram illustrating a mirrored coordinate system that is generated when a directional antenna is employed according to an embodiment of the present invention.

A vector diagram illustrating a mirrored coordinate system that is generated when a directional antenna is employed according to an embodiment of the present invention is shown in FIG. 4. In this example, two locations $(x_i, y_i)$ and $(x_j, y_j)$ are used to generate the emitter's estimated location. Assume $\hat{\phi}_i^+$ and $\hat{\phi}_j^+$ represent two estimated line-of-bearing (LOB) inputs, and $(x_i, y_i)$ and $(x_j, y_j)$ represent the measurement locations where the two LOBs were obtained. The symbols $l_i^+$ and $l_j^+$ denote, respectively, the vectors generated with bearings and $\hat{\phi}_i^+$, and $\hat{\phi}_j^+$, and the locations $(x_i, y_i)$ and $(x_j, y_j)$.

The intercept of the two bearing vectors $l_i^+$ and $l_h^+$ provides a geolocation estimate based on the two bearing angles $\hat{\phi}_i^+$ and $\hat{\phi}_j^+$. The estimated intercept geolocation is denoted as $(x_{ij}^{I+}, y_{ij}^{I+})$. For each pair of lines-of-bearing (LOBs) that intersect, there will be an intercept point for geolocation estimate. For example, for three LOBs, there will be up to three intercept points. For four LOBs, there will be up to six intercept points, and so on, as can be calculated as described above.

Due to the symmetrical nature of directional antenna 140, signals with any given signal-to-noise ratio (SNR) are perceived symmetrically about the antenna centerline or boresight. This is shown by the gain symmetry about zero degrees in the directional antenna gain graph 240, i.e., for any given arrival angle +β from zero degrees to +180 the antenna has the same antenna gain as an arrival angle of −β. For example, a signal with an arrival angle of +15 degrees is indistinguishable from a signal with an arrival angle of −15 degrees because the directional antenna gain is equivalent at both +15 and −15 degrees. As a result, all of the pair-wise line-of-bearing (LOB) intersections will also have an identical mathematical twin on the opposite side of the X axis as viewed in FIG. 4. This intersection is labeled as $(x_{ij}^{I-}, y_{ij}^{I-})$ in FIG. 4.

Actual pair-wise line-of-bearing (LOB) intersections that are on the positive side of the X axis are described as real intersections while pair-wise line-of-bearing (LOB) intersections that are on the negative side of the X axis are said to be image side intersections. Because both the real intersections and image side intersections are viable mathematical solutions to the line-of-bearing (LOB) intersection computation, one or the other should be filtered out of the data set used for geolocation estimation in order to avoid ambiguity.

Figure 5:
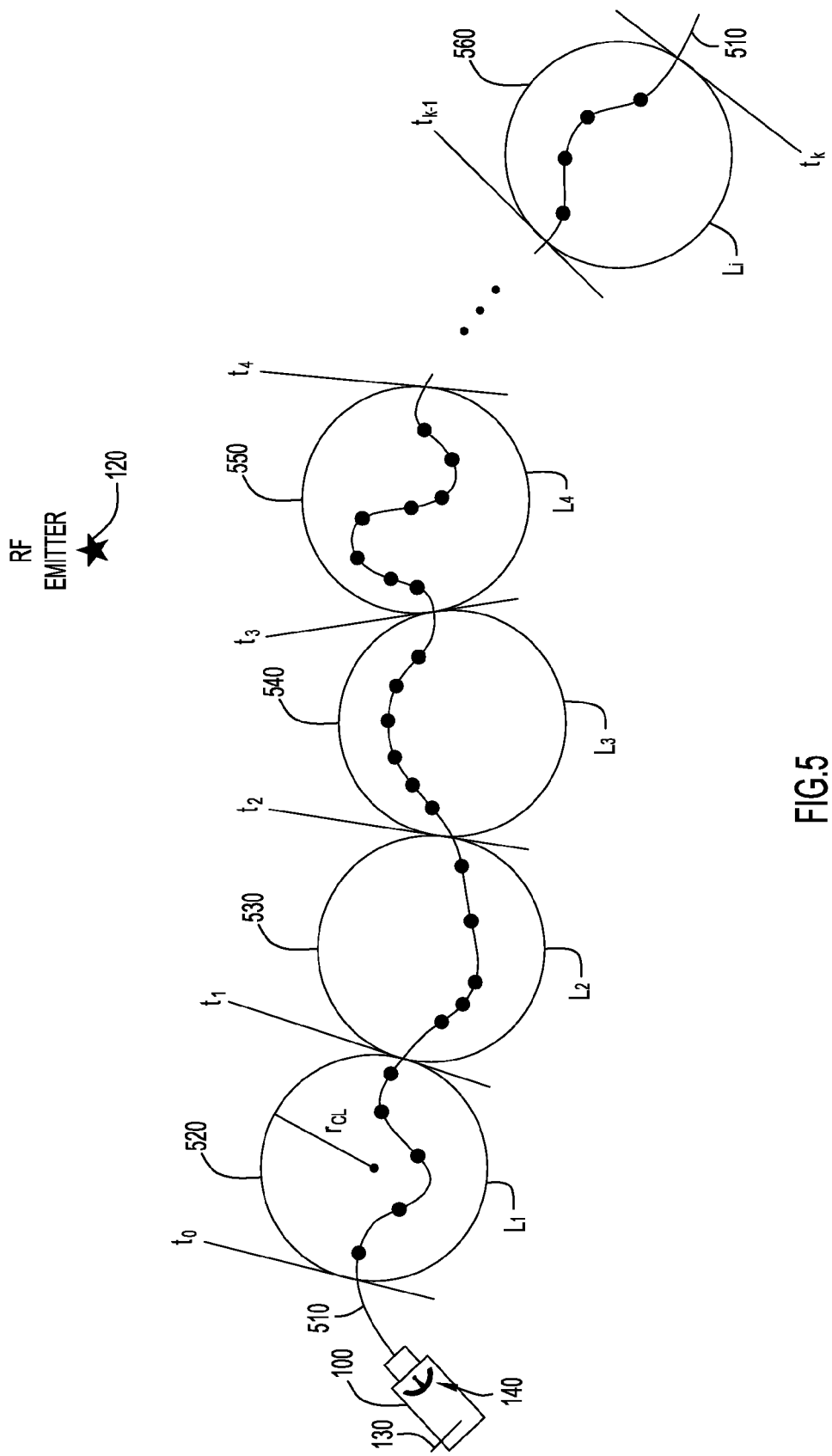
FIG. 5 is a diagrammatic illustration of an example scheme for collecting signal-to-noise ratio (SNR) measurements in clusters according to an embodiment of the present invention.

An example scheme for collecting signal-to-noise ratio (SNR) measurements in groups or clusters, and forming the clusters according to an embodiment of the present invention is illustrated in FIG. 5. Mobile sensor 100 (FIG. 1) receives signals transmitted from the radio frequency (RF) emitter 120 at known locations along path 510 (as viewed in FIG. 5). The known locations are represented as solid dots along path 510. A series of circles are shown along path 510 that represent clusters of measurements 520-560. The clusters have a system defined and configurable cluster radius $r_{CL}$, as shown in cluster 520. At time $t_0$, signal-to-noise ratio (SNR) measurements begin. Eventually, at $t_1$ mobile sensor 100 exits the region defined by cluster 520 and measurements begin for cluster 530.

Also at $t_1$ of cluster 520, all the signal-to-noise ratio (SNR) measurements are collected and a maximum signal-to-noise ratio is selected to be the representative of the cluster point. The measured location (referred to as Location L1 in FIG. 5) and the (maximum) signal-to-noise ratio (SNR) of the selected cluster point are then used for the estimation of the line-of-bearing (LOB) of that cluster (i.e., cluster 520). The same clustering and selection process follows with cluster 530, cluster 540, and so on.

At $t_2$ of cluster 530, the first intersection geolocation estimation of radio frequency (RF) emitter 120 begins with two lines-of-bearing (LOBs) estimates from clusters 520 and 530 according to pair-wise line-of-bearing (LOB) emitter geolocation technique. At $t_3$ of cluster 540, the pair-wise line-of-bearing (LOB) emitter geolocation technique performs geolocation estimates of radio frequency (RF) emitter 120 for clusters 530 and 540 and for clusters 520 and 540, respectively. In other words, two separate intersection geolocation estimates are obtained with two separate lines-of-bearing (LOBs) pairs obtained from clusters 530 and 540 and from clusters 520 and 540, respectively.

The pair-wise line-of-bearing (LOB) emitter geolocation clustering and selection process continues along path 510 through location $L_j$, from cluster 520 through cluster 560, as shown in FIG. 5

Timestamps may be recorded for times $t_0$ through $t_k$. Timestamps may also be recorded for individual line-of-bearing (LOB) measurements. The timestamps may be used to populate a geolocation report or are transmitted along with line-of-bearing (LOB) measurements and/or geolocation measurements to another processing entity. The timestamps may also be used to track radio frequency (RF) emitter 120 when radio frequency (RF) emitter 120 is found to be moving.

The geographic region defining a cluster need not be limited to circles and the circle need not be defined as shown in FIG. 5. For example, the cluster radius could be defined at time $t_0$ with reference to the mobile sensor 100 being at the center of the circle (i.e., at the center of cluster 520). In another example, it may be beneficial to use rectangular coordinates to define and bound the cluster geographic region. Any suitable coordinate system and shapes defined thereby may be used.

The use of the clustering technique provides several advantages. First, by localizing the combined measurement in a cluster the spatial and/or temporal effects of the terrain as well as transient radio frequency (RF) channel effects are limited to the cluster space and the duration of the cluster. Furthermore, the processing becomes distributed across clusters. The effect of emitter movement on the various line-of-bearing (LOB) measurements is limited to the cluster. Temporal effects can be further limited by allowing the cluster to have a limited time duration, after which a new cluster may be defined or declared within the geolocation system based on current sensor location or other factors such as time of day. Accordingly, the statistical confidence level with respect emitter geolocation can be improved.

Figure 6:
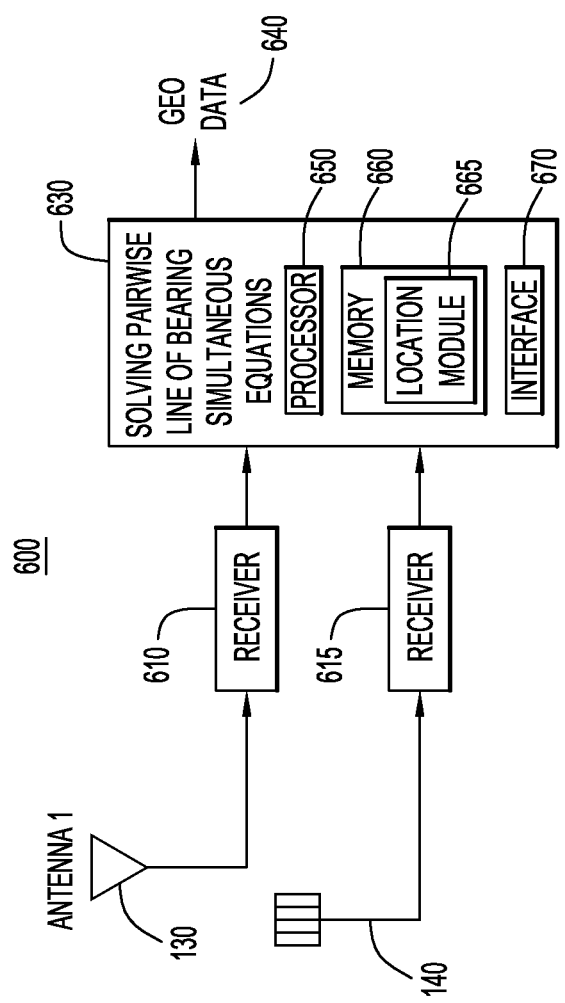
FIG. 6 is a block diagram of a system for determining geolocation of a radio frequency (RF) emitter according to an embodiment of the present invention.

An example system 600 for determining the geolocation of a radio frequency (RF) emitter according to an embodiment of the present invention is illustrated in FIG. 6. Initially, system 600 preferably resides on mobile sensor 100 (FIG. 1) to measure the signal-to-noise ratio (SNR) and determine the geolocation of the radio frequency (RF) emitter. However, the processing and one or more other portions of system 600 may be remote from the mobile sensor and receive the signal-to-noise ratio (SNR) measurements for the geolocation determination. In particular, system 600 includes antennas 130 and 140, receivers 610 and 615, and a processing device 630. Antenna 130 is preferably implemented by an omni-directional antenna and directs received signals into receiver 610, while antenna 140 is preferably implemented by a directional antenna and directs received signals into receiver 615. The antennas may be implemented by any conventional or other antenna configurable to receive the signals emitted from radio frequency (RF) emitter 120.

The receiver may be implemented by any conventional or other receiving device capable of receiving the emitted radio frequency (RF) signals and to measure the signal-to-noise ratio (SNR) of a received signal. The signal-to-noise ratio (SNR) measurements are provided to processing device 630 to determine the geolocation of radio frequency (RF) emitter 120 as described below.

Processing device 630 may include a processor 650, a memory 660, and an interface unit 670. Processor 650 determines the geolocation of radio frequency (RF) emitter 120 based on the measurements received from receivers 610 and 615, and provides corresponding geolocation data 640. The processing device includes one or more location modules 665 to determine the location of radio frequency (RF) emitter 120 from a set of simultaneous equations incorporating a pair-wise line-of-bearing (LOB) technique as described herein, e.g., using a clustering and selection geolocation process described above in connection with FIG. 5. To this end, the one or more location modules 665 may solve sets of simultaneous equations that include unknown variables representing coordinates of the location of the emitter (e.g., using Equation 4). The processor may be implemented by any conventional or other computer or processing unit (e.g., a microprocessor, a microcontroller, systems on a chip (SOCs), fixed or programmable logic, etc.), where the one or more location modules 665 may be implemented by any combination of any quantity of software and/or hardware modules or units. Memory 660 may be included within or external of processor 650, and may be implemented by any conventional or other memory unit with any type of memory (e.g., random access memory (RAM), read only memory (ROM), etc.). The memory may store the one or more location modules 665 for execution by processor 650, and data for performing the geolocation technique of present invention embodiments. Interface unit 670 enables communication between system 600 and other devices or systems, and may be implemented by any conventional or other communications device (e.g., wireless communications device, etc.).

Figure 7:
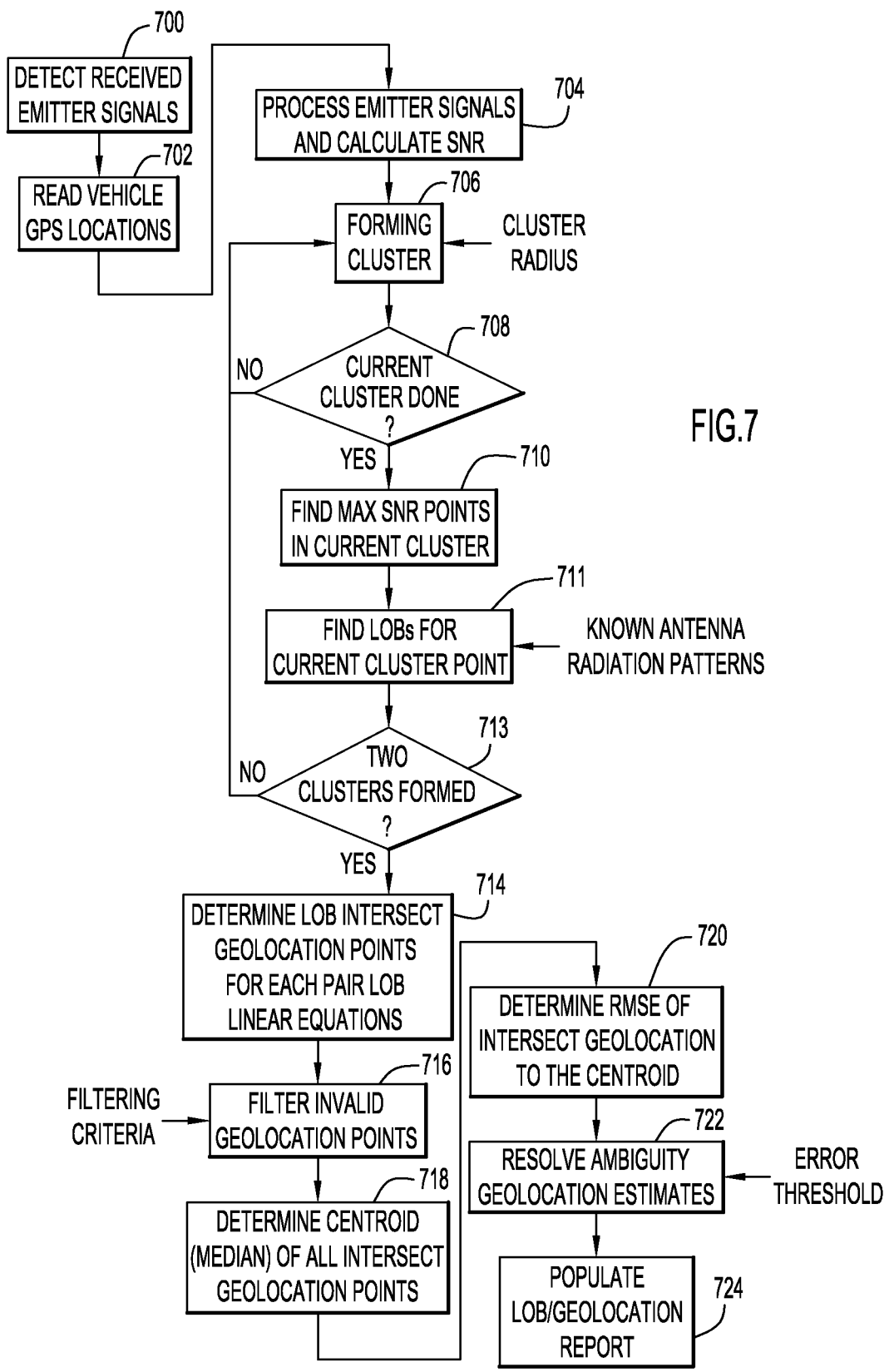
FIG. 7 is a procedural flow chart illustrating a manner in which to determine geolocation of a radio frequency (RF) emitter according to an embodiment of the present invention.

A manner in which processor 650 (e.g., via one or more location modules 665) determines the geolocation of a radio frequency (RF) emitter based on signal-to-noise ratio (SNR) measurements at various locations is illustrated in FIG. 7. Initially, one or more mobile sensors 100 detects signal-to-noise ratio (SNR) of signals emitted from radio frequency (RF) emitter 120 at one or more locations (e.g., a quantity of locations as described herein) along path 110 (or path 510) at step 700. The vehicle location is determined at step 702. The location may be obtained via satellite (e.g., Global Positioning System (GPS), Galileo, Global Navigation Satellite System (GLONASS), etc.) or by using other navigation systems. The location is used as a reference point for geolocation.

The emitter signals are processed and the signal-to-noise ratio (SNR) is calculated for each measurement at step 704. As the SNRs are calculated, they are grouped or formed into cluster of SNR measurements at step 706. It is determined if a complete cluster is formed at step 708. The clusters may be for a geographic region, for a certain time period, or both, for example. In this example, a cluster radius is fed to the cluster forming step 706. If a complete cluster is not formed the process returns to step 706. If a complete cluster is formed, the maximum signal-to-noise ratio (SNR) point for the current cluster is determined at step 710. The maximum signal-to-noise ratio (SNR) point in each cluster provides the best data point to use for line-of-bearing (LOB) determination. The maximum SNR points for each antenna may be compared to each other as a form of validation cross-check of the SNR data. The line-of-bearing (LOB) for the current cluster location (e.g., $L_i$ as viewed in FIG. 6) is determined for each cluster location at step 711. Known antenna radiation pattern data are used as an input to this part of the process as described above.

The line-of-bearing (LOB) intersection geolocation points are determined at step 714, when at least two clusters have been formed. Steps 700-713 may be performed in any order for a particular cluster, e.g., the steps may be performed on a per measurement basis, a per cluster basis, or after all clusters for a particular processing session have been selected. In other words a single signal-to-noise ratio (SNR) measurement may form a cluster. Steps 700-713 may be performed on a continuous basis. For example, after two clusters have been formed, a third cluster may be started even though the process has continued a step 714. Once the third cluster is formed, its maximum SNR points are forwarded to step 714, and so on.

The invalid geolocation points are filtered and discarded at step 716. Filtering criteria are used as an input to this part of the process and is described below. A number of filtering criteria may be employed to remove data that may be in error. For example, if the angle between any two lines-of-bearing (LOBs) is sufficiently small then large fluctuations in intersection location can occur due to errors in signal-to-noise ratio (SNR) measurement. Accordingly, an intersection may be considered valid when the angle between two lines-of-bearing (LOBs) is greater than or equal to a threshold error angle $\theta\epsilon$ (i.e., $\theta_i - \theta_j \geq \theta\epsilon$, for $i \neq j$). Any invalid intersections are filtered out of the data set. Intersections may also be filtered out of the data set if the distance $r_i$ (as viewed in FIG. 1) is greater than an error distance $r\epsilon$ (i.e., if $r_i > r\epsilon$). An error range may be used with the Cartesian coordinates, e.g., $x\epsilon$ and $y\epsilon$. For example, if $x_i > x\epsilon$ (e.g., where $x\epsilon = 800$ meters) or if $y_i > y\epsilon$ (e.g., where $y\epsilon = 400$ meters) then the intersection is discarded.

If after applying the above filters, there are no intersect points available after two consecutive geolocation estimations for either the real or image side of the X axis (FIG. 4), the remaining real or image side of the geolocation estimate is considered to be the true estimate. In other words, it is possible that only estimates remain that are on the real side or image side, and not the other. Accordingly, the confidence of the estimate is improved due to the opposite side geolocation estimate not being available for processing. Confidence is further increased after at least two estimates have been generated.

The median-based centroid of all intersecting geolocation estimates is determined at step 718. The root-mean-square-error (RMSE) of each geolocation centroid is determined at step 720. The standard deviation of the centroid may be used as a root-mean-square-error (RMSE) measure. The standard deviation of the centroid computed on the real side of the X axis (or other line of symmetry) denoted as $Std_R$ can be compared to the standard deviation of the centroid computed on the image side of the X axis (or on the opposite side of the line of symmetry), denoted as $Std_I$.

The standard deviations may be computed as follows:

$$Std_R = \frac{1}{M-1}\sqrt{\sum_k (x_k - x_c)^2 + \sum_k (y_k - y_c)^2} \qquad \text{(Equation 7)}$$

$$Std_I = \frac{1}{M-1}\sqrt{\sum_k (x'_k - x_c)^2 + \sum_k (y'_k - y_c)^2}$$

for $k=1, 2 \ldots M$, where $(x_C, y_C)$ is the centroid, $(x_k, y_k)$ are real side line-of-bearing intersection coordinates, $(x'_k, y'_k)$ are image side line-of-bearing intersection coordinates, and M represents a number of line-of-bearing intersections.

Based on the root-mean-square-errors (RMSEs) of the centroids, any ambiguities among the geolocation estimates are resolved at step 722. The ambiguities may be resolved using a ratio of the two standard deviations. When $Std_R/Std_I \leq 1/T$, where T is a predefined threshold, then the centroid $(x_C, y_C)$ is considered to be valid. When $Std_R/Std_I > T$, then the image side centroid $(x'_C, y'_C)$ is considered valid. If $1/T < (Std_R/Std_I) \leq T$, then both the real and image side centroids are considered valid. When both the real and image side centroids are considered valid, then additional steps to resolve the ambiguity may need to be employed, e.g., a rational selection of one or the other, or the centroids may be discarded. T is an error threshold that is used as an input to this part of the process. After the ambiguities are resolved, the line-of-bearing (LOB) and/or geolocation estimates are used to populate a geolocation report at step 724.

The geolocation information for the radio frequency (RF) emitter may be used for various applications. For example, the location information may be processed by processor 630 or forwarded to another system via interface unit 670. The location information may be processed to direct or control a vehicle or other platform to an emitter at a location of interest (e.g., to provide assistance at that location, to provide assistance for jamming at that direction/location, etc.). Further, the location information may be utilized to generate an image of the area and indicate the emitter locations.

Figure 8B:
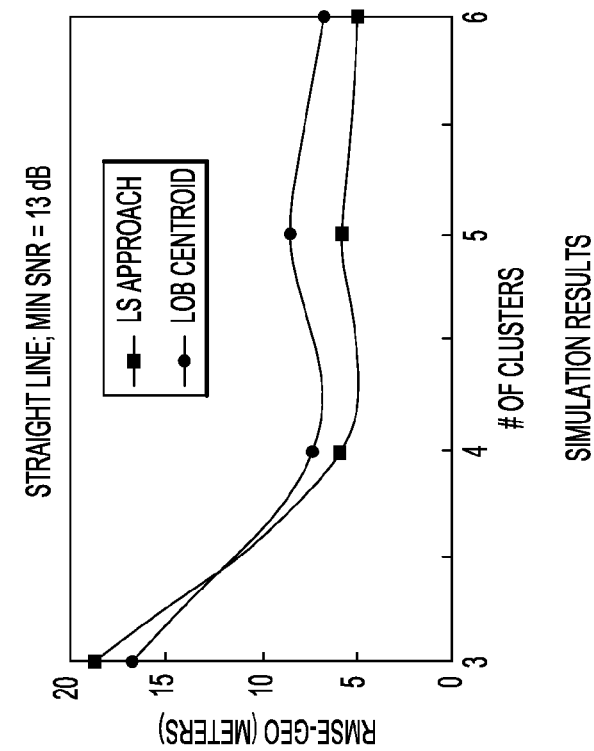
FIG. 8B is a graphical representation of simulation results for an embodiment of the present invention illustrating the relationship between geolocation error and the quantity of locations for signal-to-noise ratio (SNR) measurements when the linear path is employed according to FIG. 8A.
Figure 8A:
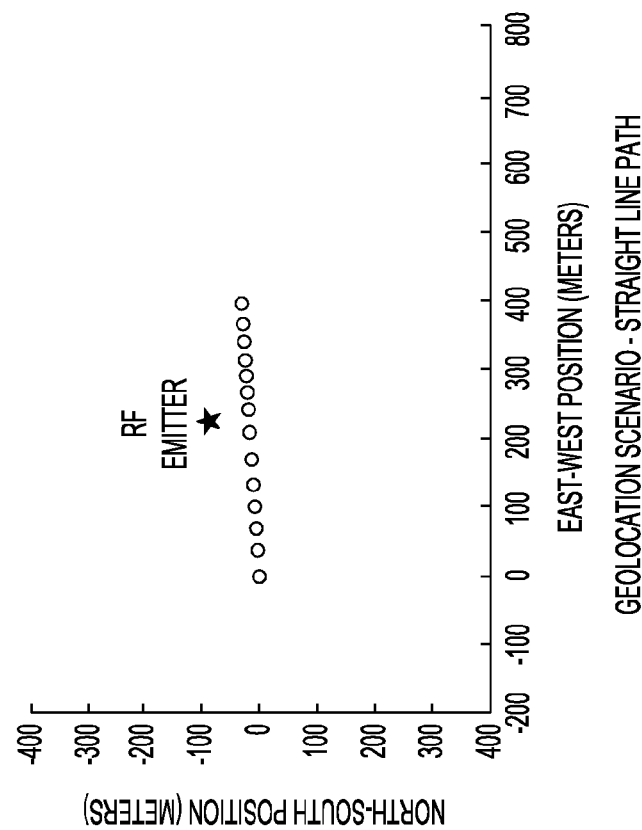
FIG. 8A is a graphical representation of a linear path used by a vehicle when measuring received signal strength (RSS) of transmitted signals.

The geolocation technique of a present invention embodiment employing ground vehicle has been modeled and simulated using Matlab tools available from The Mathworks, Inc. of Natick, Mass. A graphical illustration of the cluster locations used for a first simulation is illustrated in FIG. 8A. FIG. 8A depicts the relationship between North-South position and East-West position in meters. For the first simulation, a straight line path was used for the mobile sensor. A graphical illustration of the simulation results providing the relationship between geolocation error and the quantity of locations for signal-to-noise ratio (SNR) measurements is illustrated in FIG. 8B. In the simulation, the following conditions were assumed: the signal to noise ratio (SNR) was a minimum of 13 dB; the emitter power remained constant during the measurements; and the path loss from the emitter to the sensor followed the $4^{th}$ power law.

As viewed in FIG. 8B, a Root Mean Square error (RMSE) of the geolocation estimates (e.g., derived from Equation 6 or 7) for a radio frequency (RF) emitter converges to a robust level with four or more cluster measuring locations for a straight line path. The geolocation estimates perform within approximately 2 meters of error when compared the least-squares (LS) geolocation approach.

Figure 9B:
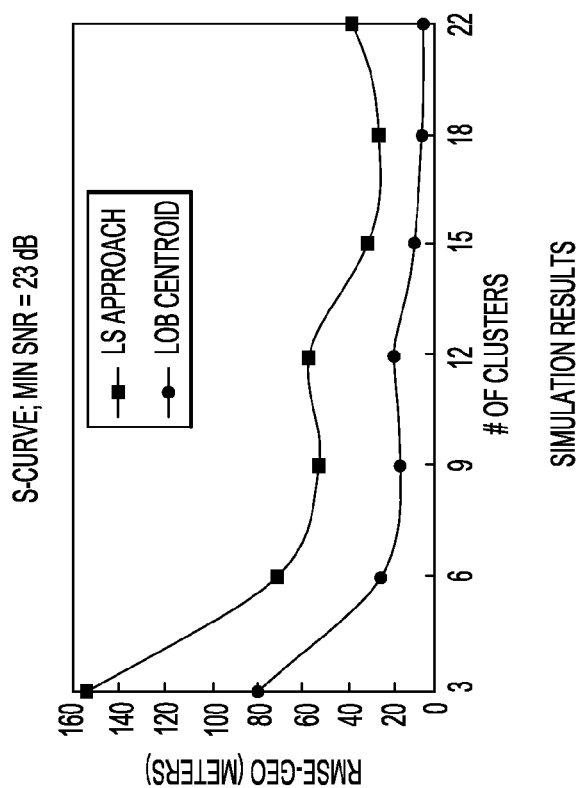
FIG. 9B is a graphical representation of simulation results for an embodiment of the present invention illustrating the relationship between geolocation error and the quantity of locations for signal-to-noise ratio (SNR) measurements when the curved path is employed according to FIG. 9A.
Figure 9A:
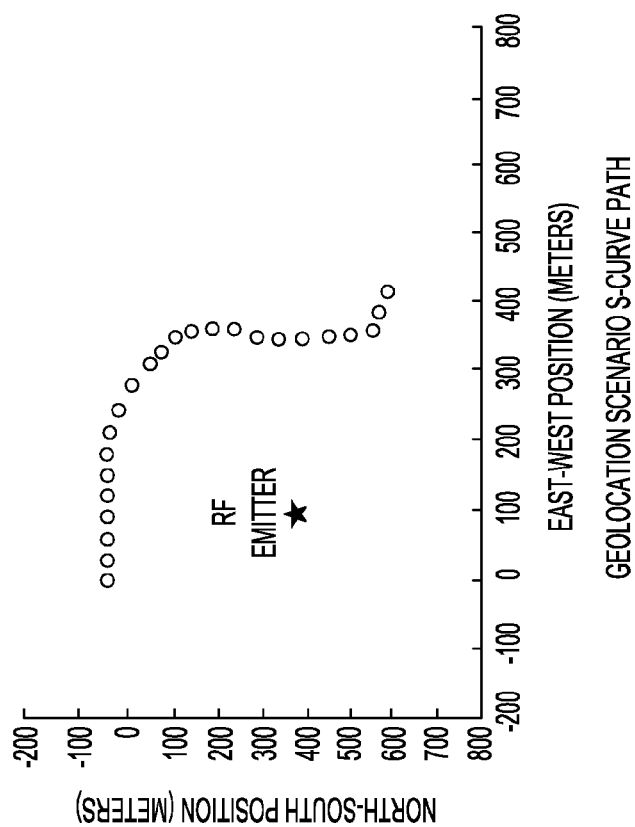
FIG. 9A is a graphical representation of a curved path used by a vehicle when measuring signal-to-noise ratio (SNR) of received signals.

A graphical illustration of the cluster locations used for a second simulation is illustrated in FIG. 9A. FIG. 9A depicts the relationship between North-South position and East-West position in meters. For the second simulation an S-curve path was used for the mobile sensor. A graphical illustration of the simulation results providing the relationship between geolocation error and the quantity of locations for signal-to-noise ratio (SNR) measurements is illustrated in FIG. 9B. In the simulation, the following conditions were assumed: the signal to noise ratio (SNR) was a minimum of 23 dB; the emitter power remained constant during the measurements; and the path loss followed the $4^{th}$ power law.

As viewed in FIG. 9B, a Root Mean Square error (RMSE) of the geolocation estimates (e.g., derived from Equation 6 or 7) for a radio frequency (RF) emitter starts to converge at approximately six cluster measuring locations and converges to a robust level with nine or more cluster measuring locations for an S-curve path. The geolocation estimates perform significantly better than the least-squares (LS) geolocation approach with the RMSE converging to almost zero for a large number of cluster measuring locations as mentioned above.

The simulation results indicate that the present invention geolocation technique is compatible with terrain based ground vehicles, and provides geolocation estimates of radio frequency (RF) emitters with a reliability comparable to or better than the least-squares (LS) approach while at the same time reducing the computational complexity of the overall geolocation system.

It will be appreciated that the embodiments described above and illustrated in the drawings represent only a few of the many ways of implementing a system and method for direction finding (DF) and geolocation of emitters based on line-of-bearing intersections.

The environment of the present invention embodiments may include any quantity of mobile sensors, and emitters. The emitters may be implemented by any quantity of any conventional or other devices emitting radio frequency (RF) or any other suitable signals (e.g., signals in any suitable bands (e.g., infrared, microwave, optical, etc.)). The emitters may be located at any quantity of any desired locations within the dimensional space of the environment. The mobile sensors may be implemented by any quantity of any conventional or other mobile or stationary vehicle or platform (e.g., unmanned air vehicle (UAV), air vehicle, ground vehicle, platform or structure mounted at a location or on a vehicle, etc.), and may include any quantity of any conventional or other sensing device (e.g., RF or other sensor, etc.). The mobile sensors may each measure any desired characteristics of emitted signals at any one or more locations within the environment.

The vehicle path may traverse any desired locations within the environment, where any quantity of measurements may be obtained during traversal of the path. Further, measurements may be obtained at any locations residing within a specified offset or range from the pre-planned path. Alternatively, the path may be determined in random fashion.

The antenna may be implemented by any conventional or other antenna (e.g., omni-directional, directional, etc.) configurable to receive the signals emitted from the one or more emitters. The receiver may be implemented by any conventional or other receiving device capable of receiving the emitted radio frequency (RF) or other measurable signals.

The processor may be implemented by any quantity of any conventional or other computer systems or processing units (e.g., a microprocessor, a microcontroller, systems on a chip (SOCs), fixed or programmable logic, etc.), and may include any commercially available or custom software (e.g., communications software, location modules, etc.).

It is to be understood that the software (e.g., location modules, etc.) for the processor of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The processor of the present invention embodiments may alternatively be implemented by any type of hardware and/or other processing circuitry. The various functions of the processor may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the processor, receiver, and/or external devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., location modules, etc.) may be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium. Further, the tangible recordable or computer usable medium may be encoded with instructions or logic to perform the functions described herein (e.g., embedded logic such as an application specific integrated circuit (ASIC), digital signal processor (DSP) instructions, software that is executed by a processor, etc.).

The memory may be included within or external of the processor, and may be implemented by any conventional or other memory unit with any suitable storage capacity and any type of memory (e.g., random access memory (RAM), read only memory (ROM), etc.). The memory may store any desired information for performing the geolocation technique of present invention embodiments (e.g., location modules, data, etc.). The interface unit may be implemented by any quantity of any conventional or other communications device (e.g., wireless communications device, wired communication device, etc.), and may be configured for communication over any desired network (e.g., wireless, cellular, LAN, WAN, Internet, Intranet, VPN, etc.).

Present invention embodiments may employ any quantity of variables or equations to determine the estimated location of one or more emitters, provided that the quantity of equations is greater than or equal to the quantity of unknown variables. The equations may be represented in any desired form (e.g., matrix form, vectors, scalars, etc.), and be solved in any desired fashion to enable determination of the emitter location. The location estimate may be produced and/or converted to any desired form, and may be provided with respect to any desired reference (e.g., coordinates within the space, longitude and latitude indications, GPS coordinates, etc.).

The measurements may be made at any quantity of locations within the geolocation environment, and those measurements may be filtered, discarded, or weighted using any technique that is suitable for the geolocation techniques described herein. For example, any number of statistical or threshold optimization techniques may be employed to provide a geolocation estimate of emitter location using the line-of-bearing techniques described herein.

The resulting location estimate may be utilized for any suitable applications (e.g., generation of a map image of the area, vehicle or other platform guidance systems to direct the vehicle or platform toward or away from areas, radar or other detection systems, etc.).

The various indices (e.g., i, N, etc.) are preferably integers, but may be any types of numbers with any suitable numeric ranges.

It is to be understood that the terms "top", "bottom", "front", "rear", "side", "height", "length", "width", "upper", "lower", "vertical" and the like are used herein merely to describe points of reference and do not limit the present invention to any particular orientation or configuration.

From the foregoing description, it will be appreciated that the invention makes available a novel system and method for direction finding (DF) and geolocation of emitters based on line-of-bearing intersections, wherein locations of radio frequency (RF) emitters are determined based on signal-to-noise ratio (SNR) measurements of the emitters at various locations.

Having described example embodiments of a new and improved system and method for direction finding (DF) and geolocation of emitters based on line-of-bearing intersections, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for locating an emitter comprising:
a plurality of antennas including a first antenna with a first radiation pattern and a second different antenna with a second radiation pattern different from the first radiation pattern, wherein the first and second radiation patterns provide a received signal gain with respect to signals received from said emitter;
a receiver to receive signals from each of said plurality of antennas transmitted by said emitter and obtain received signal strength measurements of said received signals at a plurality of different locations; and
a processor to process said received signal strength measurements to locate said emitter, wherein said processor includes:
a location module to:
process said received signal strength measurements and determine lines-of-bearing to said emitter based on a combination of received signal strength measurements of a signal received by each of said first antenna and said second antenna at said plurality of different locations; and
determine a location of said emitter based on intersections of said lines-of-bearing to said emitter at said plurality of different locations.

2. The system of claim 1, wherein said received signal strength measurements include signal-to-noise ratio measurements of said signals received at said plurality of antennas.

3. The system of claim 2, wherein said location module determines a maximum signal-to-noise ratio from said signal-to-noise ratio measurements and determines a line-of-bearing to said emitter based on said maximum signal-to-noise ratio.

4. The system of claim 2, wherein said location module:
groups said received signal strength measurements into at least two clusters;
determines a maximum signal-to-noise ratio from said signal-to-noise ratio measurements within each cluster; and
determines a line-of-bearing to said emitter based on each of said maximum signal-to-noise ratios.

5. The system of claim 1, wherein said location module determines said location by solving a set of simultaneous equations relating to said lines-of-bearing, wherein said set of simultaneous equations include unknown variables representing coordinates of said location of said emitter.

6. The system of claim 5, wherein said set of simultaneous equations includes:

$$\begin{pmatrix} x_{ij} \\ y_{ij} \end{pmatrix} = \begin{pmatrix} -m_i & 1 \\ -m_j & 1 \end{pmatrix}^{-1} \begin{pmatrix} y_i - m_i x_i \\ y_j - m_j x_j \end{pmatrix}$$

and wherein $x_{ij}$, $y_{ij}$ represent said coordinates of said location of said emitter, and $(x_i, y_i)$, $(x_j, y_j)$, (for i, j=1 to N, i·j) represent coordinates of said locations for obtaining said received signal strength measurements, and N represents a quantity of said locations for obtaining said received signal strength measurements.

7. The system of claim 5, wherein said location module computes a line-of-bearing from each of said plurality of different locations within to said emitter.

8. The system of claim 7, wherein said location module computes a plurality of line-of-bearing intersections that approximate said location of said emitter using line-of-bearing pairs.

9. The system of claim 8, wherein said location module filters said plurality of line-of-bearing intersections by comparing each individual line-of-bearing intersection to filtering criteria, wherein when said individual line-of-bearing intersection does not meet said filtering criteria said individual line-of-bearing intersection is discarded.

10. The system of claim 8, wherein said location module determines one or more arithmetic median value based geolocation centroids from selected ones of said plurality of line-of-bearing intersections.

11. The system of claim 10, wherein said one or more geolocation centroids are determined using the set of equations:

$$x_C = \text{median}(x_1, x_2 \ldots x_M)$$

$$y_C = \text{median}(y_1, y_2 \ldots y_M)$$

and wherein $x_C$, $y_C$ represent coordinates of said geolocation centroid, and M represents a quantity of said line-of-bearing intersections.

12. The system of claim 10, wherein said location module computes a root-mean-square error of said one or more geolocation centroids.

13. The system of claim 12, wherein said location module computes said root-mean-square error of said one or more geolocation centroids using the set of equations:

$$Std_R = \frac{1}{M-1}\sqrt{\sum_k (x_k - x_c)^2 + \sum_k (y_k - y_c)^2}$$

$$Std_I = \frac{1}{M-1}\sqrt{\sum_k (x'_k - x_c)^2 + \sum_k (y'_k - y_c)^2}$$

for k=1, 2 ... M, and wherein $Std_R$ and $Std_I$ represent root-mean-square errors with respect to opposite sides of an axis of symmetry, $x_C$, $y_C$ represent coordinates of said geolocation centroid, $x_k$, $y_k$ represent line-of-bearing intersection coordinates on a side of a line of symmetry and ($x'_k$, $y'_k$) represent line-of-bearing intersection coordinates on an opposite side of said line of symmetry, and M represents a quantity of said line-of-bearing intersections.

14. The system of claim 13, wherein said location module filters said one or more geolocation centroids by comparing a ratio of $Std_R$ and $Std_I$ to an error threshold, wherein when said ratio does not pass said error threshold a geolocation centroid used as a basis for said root-mean-square error computation is discarded.

15. The system of claim 1, wherein said signals transmitted by said emitter include radio frequency signals.

16. The system of claim 1, wherein said receiver is mounted on a mobile platform that traverses a pre-planned path to obtain said received signal strength measurements at said plurality of locations.

17. The system of claim 16, wherein said mobile platform includes a terrain based vehicle or an unmanned aerial vehicle.

18. The system of claim 1, further including a plurality of receivers each mounted on a stationary platform at a corresponding one of said plurality of locations to obtain said received signal strength measurements.

19. The system of claim 1, wherein said first antenna comprises an omni-directional antenna and said second antenna comprises a directional antenna.

20. A method for locating an emitter comprising:
(a) receiving signals transmitted by said emitter via each of a plurality of antennas including a first antenna with a first radiation pattern and a second different antenna with a second radiation pattern different from the first radiation pattern, wherein the first and second radiation patterns provide a received signal gain with respect to signals received from said emitter, and obtaining received signal strength measurements of said received signals at a plurality of different locations; and
(b) processing said received signal strength measurements, via a processor, and determining lines-of-bearing to said emitter based on a combination of received signal strength measurements of a signal received by each of said first antenna and said second antenna at said plurality of different locations to determine a location of said emitter based on intersections of said lines-of-bearing to said emitter at said plurality of different locations.

21. The method of claim 20, wherein step (b) further includes:
(b.1) determining said location using signal-to-noise ratio measurements of said signals received at said plurality of antennas.

22. The method of claim 21, wherein step (b.1) further includes:
(b.1.1) determining a maximum signal-to-noise ratio from said signal-to-noise ratio measurements; and
(b.1.2) determining a line-of-bearing to said emitter based on said maximum signal-to-noise ratio.

23. The method of claim 21, wherein step (b.1) further includes:
(b.1.1) grouping said received signal strength measurements into at least two clusters;
(b.1.2) determining a maximum signal-to-noise ratio from said signal-to-noise ratio measurements within each cluster; and
(b.1.3) determining a line-of-bearing to said emitter based on each of said maximum signal-to-noise ratios.

24. The method of claim 20, wherein step (b) further includes:
(b.1) determining said location by solving a set of simultaneous equations relating to said lines-of-bearing, wherein said set of simultaneous equations include unknown variables representing coordinates of said location of said emitter.

25. The method of claim 24, wherein said set of simultaneous equations includes:

$$\begin{pmatrix} x_{ij} \\ y_{ij} \end{pmatrix} = \begin{pmatrix} -m_i & 1 \\ -m_j & 1 \end{pmatrix}^{-1} \begin{pmatrix} y_i - m_i x_i \\ y_j - m_j x_j \end{pmatrix}$$

and wherein $x_{ij}$, $y_{ij}$ represent said coordinates of said location of said emitter, and ($x_i$, $y_i$), ($x_j$, $y_j$), (for i, j=1 to N, i≠j) represent coordinates of said locations for obtaining said received signal strength measurements, and N represents a quantity of said locations for obtaining said received signal strength measurements.

26. The method of claim 24, wherein step (b.1) further includes:
(b.1.1) computing a line-of-bearing from each of said plurality of different locations to said emitter.

27. The method of claim 26, wherein step (b.1) further includes:
(b.1.2) computing a plurality of line-of-bearing intersections that approximate said location of said emitter using line-of-bearing pairs.

28. The method of claim 27, wherein step (b) further includes:
(b.2) filtering said plurality of line-of-bearing intersections by comparing each individual line-of-bearing intersection to filtering criteria, wherein when said individual line-of-bearing intersection does not meet said filtering criteria said individual line-of-bearing intersection is discarded.

29. The method of claim 27, wherein step (b) further includes:
(b.2) determining one or more arithmetic median value based geolocation centroids from selected ones of said plurality of line-of-bearing intersections.

30. The method of claim 29, wherein said one or more geolocation centroids are determined using the set of equations:

$$x_C = \text{median}(x_1, x_2 \ldots x_M)$$
$$y_C = \text{median}(y_1, y_2 \ldots y_M)$$

and wherein $x_C$, $y_C$ represent coordinates of said geolocation centroid, and M represents a quantity of said line-of-bearing intersections.

31. The method of claim 30, wherein step (b) further includes:
(b.3) computing a root-mean-square error of said one or more geolocation centroids.

32. The method of claim 31, wherein step (b.3) computes said root-mean-square error of said one or more geolocation centroids using the set of equations:

$$Std_R = \frac{1}{M-1}\sqrt{\sum_k (x_k - x_c)^2 + \sum_k (y_k - y_c)^2}$$

$$Std_I = \frac{1}{M-1}\sqrt{\sum_k (x'_k - x_c)^2 + \sum_k (y'_k - y_c)^2}$$

for k=1, 2 ... M, and wherein $Std_R$ and $Std_I$ represent root-mean-square errors with respect to opposite sides of an axis of symmetry, $x_C$, $y_C$ represent coordinates of said geolocation centroid, $x_k$, $y_k$ represent line-of-bearing intersection coordinates on a side of a line of symmetry and ($x'_k$, $y'_k$) represent line-of-bearing intersection coordinates on an opposite side of said line of symmetry, and M represents a quantity of said line-of-bearing intersections.

33. The method of claim 32, wherein step (b) further includes:
(b.4) filtering said one or more geolocation centroids by comparing a ratio of $Std_R$ and $Std_I$ to an error threshold, wherein when said ratio does not pass said error threshold a geolocation centroid used as a basis for said root-mean-square error computation is discarded.

34. The method of claim 20, wherein said first antenna comprises an omni-directional antenna and aid second antenna comprises a directional antenna.

35. A program product apparatus comprising a non-transitory computer readable memory device with computer program logic recorded thereon for locating an emitter, wherein a receiver receives signals transmitted by said emitter via each of a plurality of antennas including a first antenna with a first radiation pattern and a second different antenna with a second radiation pattern different from the first radiation pattern to obtain received signal strength measurements of said received signals at a plurality of different locations, said program product apparatus further comprising:

a location module to process said received signal strength measurements of signals transmitted by said emitter and obtained at a plurality of different locations, and determine lines-of-bearing to said emitter based on a combination of received signal strength measurements of a signal received by each of said first antenna and said second antenna at said plurality of different locations to determine a location of said emitter based on intersections of aid lines-of-bearing to said emitter at said plurality of different locations.

36. The apparatus of claim 35, wherein said received signal strength measurements include signal-to-noise ratio measurements of said signals received at said plurality of antennas.

37. The apparatus of claim 36, wherein said location module determines a maximum signal-to-noise ratio from said signal-to-noise ratio measurements and determines a line-of-bearing to said emitter based on said maximum signal-to-noise ratio.

38. The apparatus of claim 36, wherein said location module:
groups said received signal strength measurements into at least two clusters;
determines a maximum signal-to-noise ratio from said signal-to-noise ratio measurements within each cluster; and
determines a line-of-bearing to said emitter based on each of said maximum signal-to-noise ratios.

39. The apparatus of claim 35, wherein said location module determines said location by solving a set of simultaneous equations relating to said lines-of-bearing, wherein said set of simultaneous equations include unknown variables representing coordinates of said location of said emitter.

40. The apparatus of claim 39, wherein said set of simultaneous equations includes:

$$\begin{pmatrix} x_{ij} \\ y_{ij} \end{pmatrix} = \begin{pmatrix} -m_i & 1 \\ -m_j & 1 \end{pmatrix}^{-1} \begin{pmatrix} y_i - m_i x_i \\ y_j - m_j x_j \end{pmatrix}$$

and wherein $x_{ij}$, $y_{ij}$ represent said coordinates of said location of said emitter, and ($x_i$, $y_i$), ($x_j$, $y_j$), (for i, j=1 to N, i≠j) represent coordinates of said locations for obtaining said measurements, and N represents a quantity of said locations for obtaining said received signal strength measurements.

41. The apparatus of claim 39, wherein said location module computes a line-of-bearing from each of said plurality of different locations to said emitter.

42. The apparatus of claim 41, wherein said location module computes a plurality of line-of-bearing intersections that approximate said location of said emitter using line-of-bearing pairs.

43. The apparatus of claim 42, wherein said location module filters said plurality of line-of-bearing intersections by comparing each individual line-of-bearing intersection to filtering criteria, wherein when said individual line-of-bearing intersection does not meet said filtering criteria said individual line-of-bearing intersection is discarded.

44. The apparatus of claim 42, wherein said location module determines one or more arithmetic median value based geolocation centroids from selected ones of said plurality of line-of-bearing intersections.

45. The apparatus of claim 44, wherein said one or more geolocation centroids are determined using the set of equations:

$$x_C = \text{median}(x_1, x_2 \ldots x_M)$$

$$y_C = \text{median}(y_1, y_2 \ldots y_M)$$

and wherein $x_C$, $y_C$ represent coordinates of said geolocation centroid, and M represents a quantity of said line-of-bearing intersections.

46. The apparatus of claim 44, wherein said location module computes a root-mean-square error of said one or more geolocation centroids.

47. The apparatus of claim 46, wherein said location module computes said root-mean-square error of said one or more geolocation centroids using the set of equations:

$$Std_R = \frac{1}{M-1}\sqrt{\sum_k (x_k - x_c)^2 + \sum_k (y_k - y_c)^2}$$

$$Std_I = \frac{1}{M-1}\sqrt{\sum_k (x'_k - x_c)^2 + \sum_k (y'_k - y_c)^2}$$

for k=1, 2 . . . M, and wherein $Std_R$ and $Std_I$ represent root-mean-square errors with respect to opposite sides of an axis of symmetry, $x_C$, $y_C$ represent coordinates of said geolocation centroid, $x_k$, $y_k$ represent line-of-bearing intersection coordinates on a side of a line of symmetry and $(x'_k, y'_k)$ represent line-of-bearing intersection coordinates on an opposite side of said line of symmetry, and M represents a quantity of said line-of-bearing intersections.

48. The apparatus of claim 47, wherein said location module filters said one or more geolocation centroids by comparing a ratio of $Std_R$ and $Std_I$ to an error threshold, wherein when said ratio does not pass said error threshold a geolocation centroid used as a basis for said root-mean-square error computation is discarded.

49. The apparatus of claim 35, wherein said first antenna comprises an omni-directional antenna and said second antenna comprises a directional antenna.

* * * * *